J. M. REED.
BOARD SUPPORT FOR SAWING MACHINES.
APPLICATION FILED APR. 20, 1912.

1,037,835.

Patented Sept. 3, 1912.

WITNESSES
C. A. Voet.
Elsie B. Specht.

INVENTOR
Jerry M. Reed
By J. C. Grimes
His Attorney

COLUMBIA PLANOGRAPH CO., WASHINGTON, D. C.

UNITED STATES PATENT OFFICE.

JERRY M. REED, OF FORT THOMAS, KENTUCKY, ASSIGNOR TO J. A. FAY & EGAN COMPANY, OF CINCINNATI, OHIO, A CORPORATION OF WEST VIRGINIA.

BOARD-SUPPORT FOR SAWING-MACHINES.

1,037,835.  Specification of Letters Patent.  Patented Sept. 3, 1912.

Application filed April 20, 1912. Serial No. 692,070.

*To all whom it may concern:*

Be it known that I, JERRY M. REED, a citizen of the United States, residing at Fort Thomas, in the county of Campbell and State of Kentucky, have invented certain new and useful Improvements in Board-Supports for Sawing-Machines, of which the following is a specification.

In sawing a board on a sawing machine, slivers are frequently broken off by the saw blade, and as the direction of the blade at the cutting point is downward, there is a tendency to carry the slivers into the slot in the board support. These slivers are frequently wedged in the slot so tightly that the saw is burned and ruined before the machine can be stopped and the sliver removed.

My invention relates to a device for sawing machines for supporting the board being sawed, and the object of my invention is to provide a board support to support a board while passing the saw blade and which will automatically eject any slivers which may be broken off by the saw blade, and in arranging said board support so that it may be moved away from the saw blade to release any slivers which might, by any possibility, be wedged in the slot.

The following description and claims and the annexed drawings set forth in detail the preferred method of carrying out my invention. The board support may, however, be made in one piece, if desired, and it may be supported in any suitable way instead of on the saw guide as shown, and used on either band or circular saws.

Figure 2:
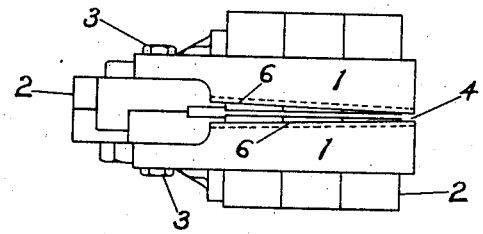
Figure 5:
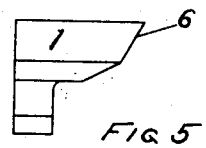
Figure 4:
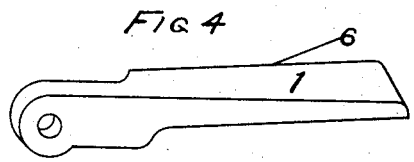
Figure 1:
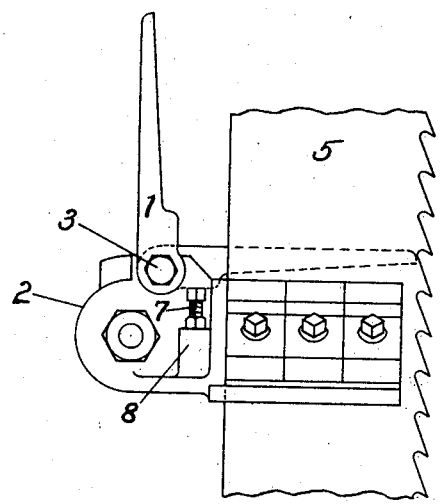
Figure 3:
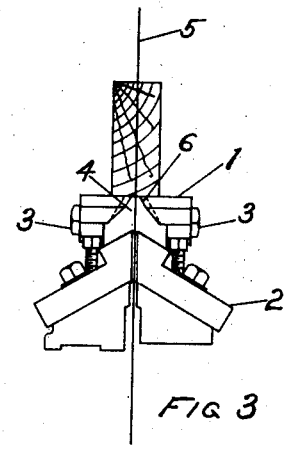

Figure 1 is a side view of my invention shown in connection with a saw guide and a band saw blade, and with one side of the support thrown back away from the saw blade. Fig. 2 is a plan view of the same, also shown in connection with the saw guide. Fig. 3 is a front view of the same shown in connection with a saw guide and band saw blade, with a board resting on the support. Fig. 4 is a perspective view of one side of the support, and Fig. 5 is an enlarged front end view thereof.

In the drawings, 1 represents the board support pivoted to the saw guide 2 on bolts 3, and forming a slot 4 in which the band saw 5 is disposed. The edges 6 of the board support adjacent to the saw blade, or the inside edge, are tapered from the front or end near the saw teeth toward the rear end, and from the top or bearing surface of the support toward the under-side thereof, forming a slot for the saw blade which increases in width from the front toward the rear end, and from the top or bearing surface toward the under-side.

The board support is supported and held in a horizontal position by the screws 7 taking into the lugs 8 on the saw guide 2. The screws 7 also serve as a means for leveling the board support and adjusting it up and down. In practice, the position of the board support must necessarily be immediately over the saw guide, and the guide, therefore, offers the most convenient means of supporting the board support. If desired, however, the board support may be provided with a support independent of the band saw guide.

When the machine is in operation the board passes on either side of the saw blade and is supported by the board support as shown in Fig. 3. The board travels from the tooth-edge toward the back of the saw blade, and if a sliver is broken off and lodges between the board support and the saw blade, the board pushes it along in the slot formed in the board support, until it reaches a part of the slot wide enough to allow it to pass through and drop to the floor. Or, if the sliver is too large to pass through the slot, either one or both sides of the board support may be thrown back from the saw blade while the machine is in motion, and the sliver in that way quickly removed and the burning and injury to the blade thereby avoided.

Having fully described my invention, what I claim and desire to secure by Letters Patent, is:—

1. A board support consisting of a supporting plate pivotally supported at its rear end, and having a slot for a saw blade, said slot extending lengthwise of said supporting plate and increasing in width from the front toward the rear end thereof.

2. A board support consisting of a supporting plate pivotally supported at its rear end, and having a slot for a saw blade, said slot extending lengthwise of said supporting plate and increasing in width from the front toward the rear end thereof, and from the top or bearing surface of the plate to the under-side.

3. A board support consisting of a supporting plate pivotally supported at its rear end, and having a slot for a band saw blade extending lengthwise of said supporting plate, and said slot increasing in width from the front toward the rear end thereof, and from the top or bearing surface of the plate toward the under-side, with means for permitting the movement of the supporting plate away from the saw blade.

4. A board support consisting of supporting plates pivotally supported at their rear ends, and forming a slot for a saw blade, said slot extending lengthwise of said supporting plates and increasing in width from the front toward the rear end thereof, and from the top of said plates toward the under-side, with means for permitting the independent movement of each plate away from the saw blade.

5. In a sawing machine, the combination of a saw blade and a saw guide therefor, of a board support consisting of one or more supporting plates for supporting a board on either side of the saw blade, said board support being pivotally supported at the rear end thereof, and forming a slot for the saw blade, said slot extending lengthwise of said board support and increasing in width from the front toward the rear end thereof, and from the top of said board support to the under-side, with means for permitting the movement of said supporting plate or plates away from the saw blade, substantially as described.

JERRY M. REED.

Witnesses:
T. C. DOCTER,
ELSIE B. SPECHT.

---

Copies of this patent may be obtained for five cents each, by addressing the "Commissioner of Patents, Washington, D. C."